June 14, 1927.  
A. STERNBERG  
1,632,321  
BLOOD TREATING PROCESS  
Filed Dec. 4, 1924
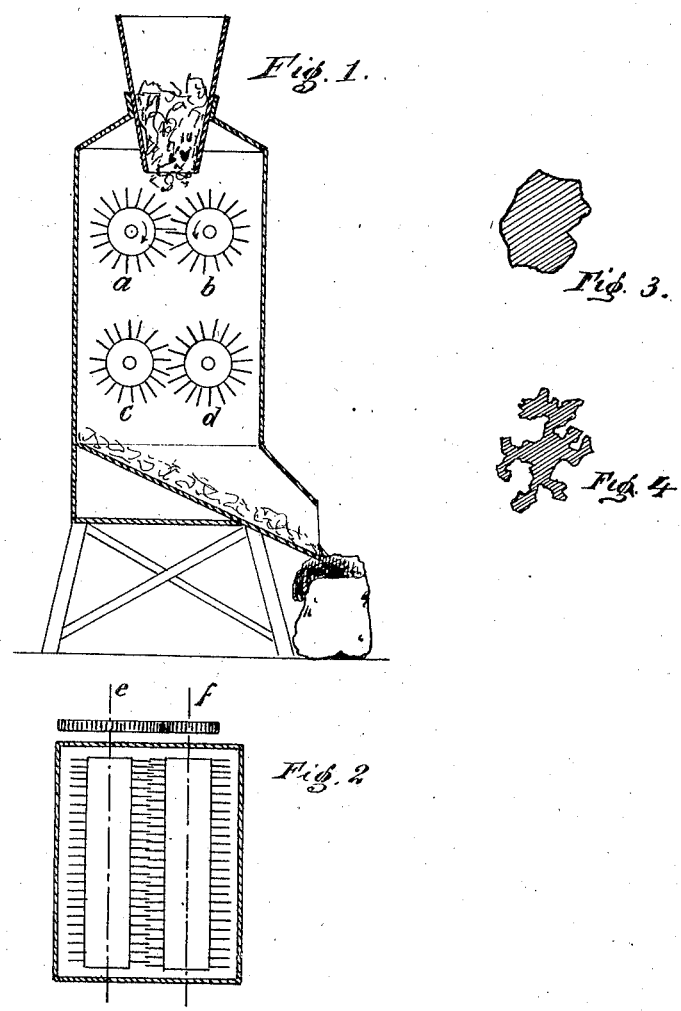

Patented June 14, 1927.

1,632,321

UNITED STATES PATENT OFFICE.

ALFRED STERNBERG, OF BERLIN-GRUNEWALD, GERMANY, ASSIGNOR TO SOCIETA INDUSTRIA GLOBEITE, OF MILAN, ITALY.

BLOOD-TREATING PROCESS.

Application filed December 4, 1924, Serial No. 753,981, and in Germany September 29, 1923.

The blood of cattle contains about 20% of different albumens in aqueous solution. Shortly after leaving the body of the animal about 2% of fibrin albumen separates off, while the other albumens remain dissolved. After removing the separated fibrin, if the water content amounting to about 80% is evaporated at temperatures below 50° C., a dry blood containing the albumens in soluble form remains. German Patent 332,434 discloses a process according to which the fibrin is not removed but is only comminuted and remains in the soluble dry blood after the evaporation process. The evaporation of the water from the blood is based on an endeavor to make the blood available for human nutrition. The evaporation of the total water i. e. over 400% of the dry blood obtained is very uneconomical because of low evaporating efficiency at the temperatures that are required for the process.

It is known, however, that the albumens of the blood, in addition to coagulating through certain chemical reactions, coagulate at temperatures above 60° C. and are converted into water-insoluble form in which it is possible to remove over 90% of the water content by mechanical methods, through filtration and pressing methods. It is the production of the coagulated, insoluble dry blood which forms the subject of the present invention.

A defect of the moist coagulum is that, independent of the temperature, it dries together in horn-like lumps which, by reason of their toughness, are comminuted only with difficulty. Even the smallest particles appear flattened blunt granules under the microscope (Figure 1). Wherever use is to be made of insoluble dry blood, it is of basic importance that it be in finely subdivided state. For example, in its use as a fodder its digestibility depends on the physical properties. Although rapidly and completely digested by the animal stomach when finely comminuted, granular dry blood, under some circumstances, passes out of the body of the animal almost unchanged. Furthermore the pressing of such dry blood produces horn-like plastic masses. The strength and polish of the pressed articles depend on the degree of fineness, as coarse material does not produce coherent masses.

In every case, the resistance of the coagulated dry blood to known comminuting processes is a technical as well as an economic obstacle.

It has been found that coagulum having a moisture content between certain limits forms a mass which can be comminuted to the finest degree, which on drying, whether in the air or by the use of heat, does not cake together, but retains the physical properties which it had before the drying process. The water-free powder obtained in this manner appears under the microscope as small fissured particles (Figure 4).

The most favorable degree of the moisture content of the coagulum lies between 30% and 60%.

While in the latter case, however, there is a troublesome "smearing" of the material during the comminuting process, if it is compressed to below 30% relatively hard cakes will be produced. There is thus no objection to pressing at 50° and preliminarily drying before comminuting at about 30°. In the process of this application the coagulum is comminuted before it may be considered as practically dry, a condition which occurs at a water content of 10% to 15%.

Figure 1 shows a schematic view in vertical section of the apparatus employed.

Figure 2 shows the same apparatus in plan section.

The comminution itself, which may be effected by any suitable apparatus, is done easily and completely by brushing. A device suitable for comminuting by brushes is shown in Figures 1 and 2. The wire brushes $a$ and $b$ formed as rollers, on the one hand, and $c$ and $d$ on the other hand, rotate in pairs in opposite directions, preferably at different rates of rotation. The material is supplied, with continuous comminution by brushing, from each higher pair of rolls to those lying therebelow. By providing a more or less heated current of air below the rolls, the material may be preliminarily and finally dried. The blood obtained by this new method of prepartion is preferably defibrinated before coagulation. Whether the blood albumens, for example, the blood serums are subjected singly or all together to the process, is immaterial as to the results of the process of the invention.

The filtrate from the coagulum forms a valuable by-product. As investigation has shown, it is almost identical with the extract obtained from cooking the lean meat of the same animal. The content of salts, such as potassium salts, phosphates, etc., is almost exactly the same, and this also applies to the content of extract substances such as creatin, creatinine, hypoxanthine, etc. This filtrate, preferably inspissated in vacuuo, corresponds almost exactly to meat extract, the flavor of which it also possesses and may be used as such if the blood is used fresh.

Claims—

1. Process for the preparation of coagulated blood which comprises coagulating said blood, partially drying the coagulum and comminuting the partially dried coagulum.

2. A process for treating blood comprising coagulating said blood, filtering the coagulum and inspissating the filtrate.

3. A process for the preparation of coagulated blood which comprises coagulating said blood, filtering said coagulum, partially drying said coagulum to limit its water content to between approximately 30-60% moisture and comminuting said partially dried coagulum.

4. A process for treating blood which comprises coagulating said blood, filtering said coagulum, and simultaneously drying and comminuting said coagulum.

5. A process for the preparation of coagulated blood which comprises coagulating said blood, filtering said coagulum, partially drying said coagulum to limit its water content to between approximately 30-60% moisture, comminuting said partially dried coagulum and then further drying said comminuted coagulum to practical dryness.

Signed at Milan (Italy) this 6th day of October, 1924.

Dr. ALFRED STERNBERG.